June 24, 1958  C. A. BEIHL  2,840,413
PAN HANDLING DEVICE
Filed Aug. 3, 1956
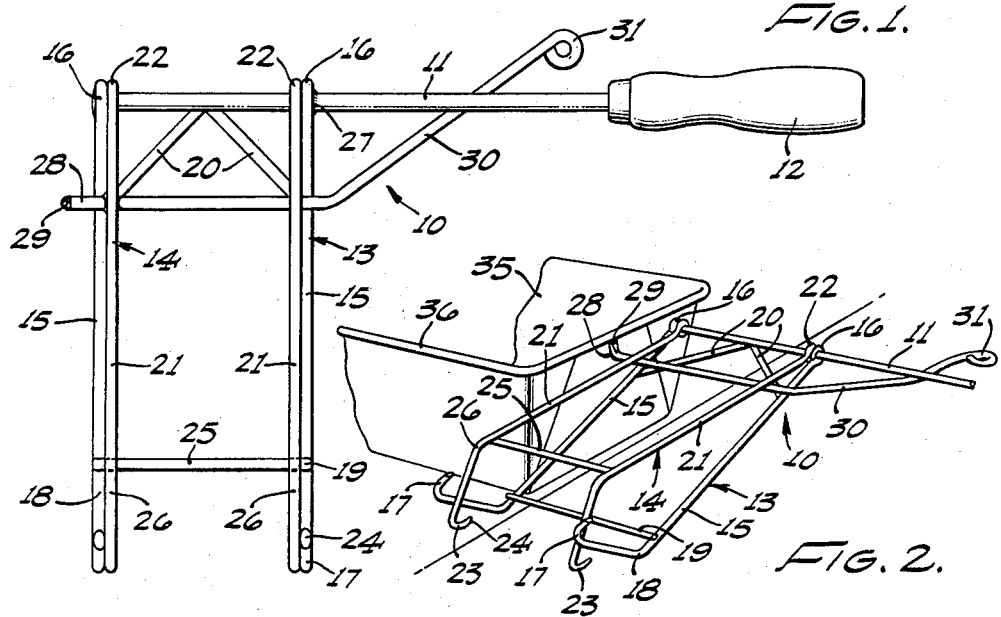
FIG. 1.
FIG. 2.
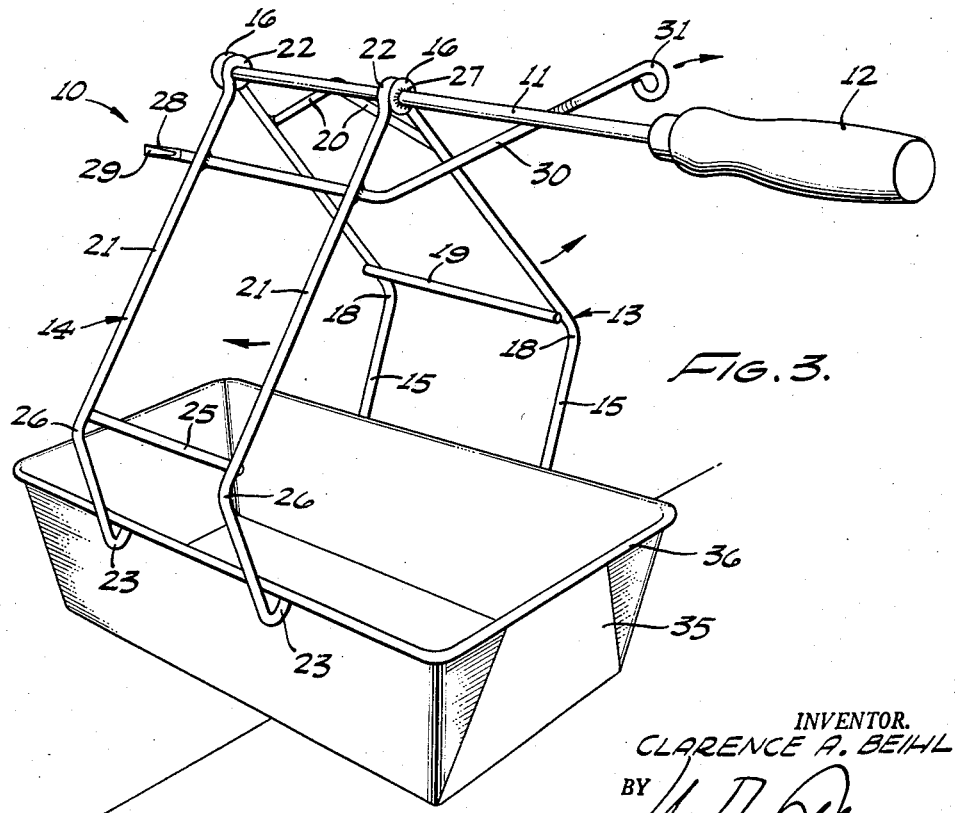
FIG. 3.
INVENTOR.
CLARENCE A. BEIHL
BY
ATTORNEY

2,840,413
PAN HANDLING DEVICE
Clarence A. Beihl, Monrovia, Calif.

Application August 3, 1956, Serial No. 602,014

2 Claims. (Cl. 294—31)

The invention relates to pan handling devices and more particularly to an improved device designed as an aid useful to housewives, cooks and chefs in handling hot pans and cooking utensils with safety and without danger of injury to the person.

Many dish and pan handling devices have been proposed heretofore for moving hot plates and the like, but all are subject to objections and shortcomings obviated by the present invention. For example, prior dish handling instruments customarily make use of a pair of tonglike members utilizing arcuate supports extending along the lower opposite rims of an earthenware plate in a manner preventing the escape of the plate from between the arms of the tongs. Although this feature has certain desirable aspects useful in handling circular plates, it is entirely unsuitable in handling non-circular cooking and baking utensils having an outwardly projecting rim or a rolled bead-type rim. Other unsatisfactory aspects of prior designs have been the lack of effective means for drawing a hot utensil from the rear of an oven to a convenient point at which it may be grasped by the handling device for transport to a work table; of a tong arranged to extend around the laterally bulging sides of bread and the like leavened baked goods to engage the utensil rim at points underlying the bulge; and of a handling device which can be held in one hand while the thumb of that hand is employed selectively to open the tongs or hold them tightly closed, as desired.

It is therefore a primary object of the invention to provide an improved handling device equally suitable for cooking and baking utensils as well as for plates and other table ware.

Another object of the invention is the provision of a handling device especially designed for the handling of hot utensils of either circular or non-circular configuration and featuring a plurality of sharpened hooks arranged in pairs in a manner to engage the flanged or rolled rims of utensils positively, thereby providing assurance against slippage of the utensil or hazard to the user.

Still another object is the provision of a hot receptacle handling device adapted for manipulation by one hand and incorporating means selectively engageable by the thumb for opening the tongs or holding the same firmly closed against the receptacle being handled.

Another object is the provision of a hot receptacle handling device having means for engaging the forward rim of an oven pan in pulling the same forward to a position for convenient engagement by the lifting tongs.

These and other objects and advantages of the invention will be more fully set forth in the following specification and claims considered in connection with the attached drawing to which they relate.

Referring to the drawing:

Figure 1 is a side elevational view of the utensil handling device showing the tong jaws closed toward one another for compact stowage;

Figure 2 is a perspective view with parts broken away showing the device in use to pull a pan from an oven; and Figure 3 is a perspective view showing the handling device applied to the opposite sides of a baking pan.

Referring to the drawing, the handling device of the present invention, designated generally 10, comprises a rigid handle shaft 11 having a handgrip 12 firmly anchored to one end. Supported at the opposite end of handle 11 are two pairs of tong members respectively designated 13 and 14, each being of the same general construction and conveniently formed from heavy-gauge stiff wire. Tong member 13 comprises a pair of bowed arms 15, 15 preferably having their upper ends 16 encircling handle 11 and rigidly secured thereto as by welding 27. The lower ends of arms 15 are provided with upturned sharpened hooks 17 shaped to engage behind the rim edges of the plate or dish, as well as within the crease formed between the side walls of a pan and its rolled rim in the manner made clear by Figure 3. Rigidly fixed between the lower ends of arms 15 in the vicinity of the bowed portion 18 is a cross brace 19. A pair of bracing members 20 may also be employed between the upper ends of arms 15 and handle 11 if desired.

Tong member 14 is similar to tong member 13, comprising a pair of outwardly bowed arms 21, 21 having their upper ends 22 encircling handle 11 closely beside ends 16 of tong member 13, but differing therefrom in being freely pivotable about handle 11. The opposite ends of arms 21 are provided with sharpened hooks 23 identical with and facing toward hooks 17. As is best indicated in Figures 1 and 2, the ends of hooks 17 and 23 are cut off on the bias in such manner that bias surfaces 24 lie closely adjacent the side walls of the pan being lifted when the handling device is in its normal operating position. It will be recognized that the sharpened points of the hooks are therefore adapted to engage behind the rolled rim of a pan to lock the tongs against disengagement with the pan while it is being lifted. Similarly to arms 15, arms 21 are held against spreading and independent pivotal movement by a cross brace 25 secured therebetween adjacent the bowed portions 26 of the arms.

Provision for using the device to withdraw pans from the rear of ovens or the rear portions of a shelf is provided in the form of a right-angle hook 28 rigidly secured to the outer one of arms 21 at a point near pivotal connection 22 of this arm with handle 11. As in the case of hooks 17 and 23, hook 28 has a bias cut end 29 facilitating its positive engagement beneath the forward rim of a pan as is illustrated in Figure 2. It will be appreciated that, if desired, hook 28 may be engaged over the upper rim of a pan from above and employed to pull the pan forward by rotating the device one-half turn from the position shown in Figure 2. This alternate mode of use is not practical if the pan being manipulated contains baked goods overlying the rim of the pan.

Preferably and as herein shown, hook 28 extends crosswise of tong member 14 and is fixedly secured to both of arms 21 to provide a support 30 for a thumbpiece 31 formed by a curled end lying in a plane generally perpendicular to handle 11 adjacent handgrip 12. Support 30 extends across and closely adjacent one side of handle 11 with the result that the latter provides a fulcrum about which thumbpiece 31 can be pivoted to hold the tongs closed. By shifting the thumb from one side to the other of thumbpiece 31 it will be recognized that the user may apply pressure to pivot tong member 14 either clockwise or counterclockwise about handle 11.

Operation

Normally, tong members 13 and 14 of the described handling device are collapsed against one another wherein they occupy a minimum of storage space. If the tongs are to be employed to lift a baking tin such as bread pan 35 having a rolled rim 36 encircling its upper rim, the operator grasps handgrip 12 in her right hand and places her thumb against the left side of thumbpiece 31 so that pressure applied by the thumb is effective to pivot tong member 14 clockwise about handle 11 to open the tongs away from one another and permit lowering of the device over the opposite sides of a utensil such as bread pan 35. The thumb pressure is then released permitting the tong members to close against the sides of the pan. Lifting of handle 11 horizontally then causes the pointed ends of hooks 17 and 23 to engage behind rolled rim 36 of the pan so that it may be transported from one point to another. Owing to the outwardly bowed shape of arms 15, 15 and 21, 21, the presence of an outwardly bulging loaf of bread in pan 35 does not interfere with the use of the handling device to engage the rim of the pan. When used with a receptacle having a rolled rim it will be apparent that the engagement of the bias-cut ends of hooks 17 and 23 serve to lock the tongs in assembled position so long as the handling device 10 is being used to apply a lifting force to the receptacle. In these circumstances it is unnecessary to apply pressure to thumbpiece 31 to hold the tongs locked closed against the receptacle. To disengage the device after the hot pan has been moved to a new location, the user merely applies pressure to the left-hand side of thumbpiece 31 as the tongs are lowered out of engagement with rim 36 thereby opening the tong members and releasing the device from the pan.

The handling device is employed in a similar manner to lift receptacles not having a rolled rim. For example, to lift a hot plate the user employs device 10 as described above to engage hooked ends 17 and 23 beneath the opposite rims of a circular plate. Before lifting the plate, however, the user shifts her thumb to the right-hand side of thumbpiece 31 and applies pressure in a counterclockwise direction about handle 11, thereby pivoting tong member 14 toward fixed tong member 13 to hold the same engaged against the rim of the plate, the plate being held against movement transversely of the tong members by a portion of the rim lying between each pair of arms 15, 15 and 21, 21.

The manner of using the device to withdraw a baking pan from the rear of an oven is illustrated in Figure 2, it being understood that pressure is applied to the right-hand side of thumbpiece 31 to hold the tong members 13 and 14 collapsed against one another as device 10 is manipulated in a manner to engage hook 28 either beneath or over the rolled rim of the baking pan. As illustrated, hook 28 is shown engaged beneath the forward rim of the pan so that it may be pulled toward the forward edge of the supporting shelf.

While the particular pan handling device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A culinary receptacle-handling device adapted to be held and manipulated by one hand comprising a rigid shaft having a handgrip fixed to one end thereof, a pair of tong jaws mounted along the opposite sides of the other end of said shaft, each of said jaws including a pair of arms bowed away from one another transversely of said shaft and having reversely-bent hooked ends shaped to engage beneath the rolled rim of a receptacle with the hooks on one jaw facing toward the hooks on the other jaw, at least one of said jaws being pivotable about said shaft, the hooked ends of said jaws being cut on the bias to provide pointed ends adapted to enter upwardly into the longitudinal crease between the side walls of a culinary receptacle and the rolled rim thereof to lock said jaws engaged with said rim while a lifting force is being applied to the receptacle by said handling device and means secured to said pivotable jaw and selectively manipulatable by the user's thumb while grasping said handle to open and close said jaws toward and away from one another, as desired.

2. The invention as defined in claim 1 including rigid hook means projecting generally at right angles to said shaft and positioned near the end thereof remote from said handgrip, said hook means being adapted to engage the forward rim of a culinary receptacle so that the same can be pulled toward the user by means of said device.

References Cited in the file of this patent

UNITED STATES PATENTS

| | | |
|---|---|---|
| 387,122 | Thompson | July 31, 1888 |
| 549,950 | Zinser | Nov. 19, 1895 |
| 583,063 | Martinie | May 25, 1897 |
| 1,337,450 | Graves | Apr. 20, 1920 |
| 1,487,739 | Harris | Mar. 25, 1924 |
| 1,726,619 | Griffith | Sept. 3, 1929 |